United States Patent
Woo et al.

(10) Patent No.: US 7,122,168 B2
(45) Date of Patent: Oct. 17, 2006

(54) SHAPE ANISOTROPIC METAL OXIDE NANOPARTICLES AND SYNTHETIC METHOD THEREOF

(75) Inventors: Kyoungja Woo, Seoul (KR); Jae-Pyoung Ahn, Seoul (KR); Hae-Weon Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 425 days.

(21) Appl. No.: 10/678,047

(22) Filed: Oct. 1, 2003

(65) Prior Publication Data

US 2004/0115124 A1 Jun. 17, 2004

(30) Foreign Application Priority Data

Oct. 2, 2002 (KR) .................. 10-2002-0060309

(51) Int. Cl.
 *C01G 1/00* (2006.01)
 *C01G 49/00* (2006.01)
(52) U.S. Cl. .............. 423/592.1; 423/138; 423/22; 423/53; 423/111; 423/89; 423/69; 423/62; 423/21.1; 423/632; 423/633; 423/607; 423/625; 423/624; 423/618; 423/608; 423/594.17; 423/606; 423/263; 423/140; 423/55; 423/122; 423/92; 423/85; 423/65; 977/773; 977/775; 977/777; 977/811
(58) Field of Classification Search .............. 423/138, 423/22, 53, 111, 89, 69, 62, 21.1, 632, 633, 423/592.1, 607, 625, 624, 618, 608, 594.17, 423/606, 263, 140, 55, 122, 92, 85, 65; 977/773, 977/775, 777, 811
See application file for complete search history.

(56) References Cited

U.S. PATENT DOCUMENTS

| 4,714,693 | A | * | 12/1987 | Targos ................ 502/261 |
| 5,770,172 | A | * | 6/1998 | Linehan et al. ......... 423/561.1 |
| 6,302,940 | B1 | | 10/2001 | Murray et al. |

OTHER PUBLICATIONS

Victor F. Puntes, et al., "Colloidal Nanocrystal Shape and Size Control: The Case of Cobalt", Science, vol. 291, Mar. 16, 2002, pp. 2115-2117.
Sang-Jae Park, et al., "Synthesis and Magnetic Studies of Uniform Iron Nanorods and Nanospheres", J. Am. Chem. Soc., 2000, 122, pp. 8581-8582.

(Continued)

*Primary Examiner*—Timothy C. Vanoy
(74) *Attorney, Agent, or Firm*—Darby & Darby (57) ABSTRACT

In a metal oxide nanoparticle and a synthetic method thereof, and in particular to maghemite ($\gamma$-$Fe_2O_3$) nanoparticles usable as a superhigh density magnetic recording substance by having good shape anisotropy and magnetic characteristics, hematite ($\alpha$-$Fe_2O_3$) nanoparticles usable as a precursor to the maghemite or a catalyst, maghemite and hematite-mixed nanoparticles and a synthetic method thereof, the method for synthesizing metal oxide nanoparticles includes forming a reverse micelle solution by adding distilled water, a surfactant and a solvent to metallic salt not less than trivalent, precipitating and separating gel type amorphous metal oxide particles by adding proton scavenger to the reverse micelle solution; adjusting a molar ratio of metal oxide to the surfactant by washing the gel type amorphous metal oxide particles with a polar solvent; and crystallizing metal oxide nanoparticles through heating or reflux after dispersing the gel type amorphous metal oxide particles in a non-polar solvent having a high boiling point.

17 Claims, 8 Drawing Sheets

OTHER PUBLICATIONS

Taeghwan Hyeon, et al., "Synthesis of Highly Crystalline and Monodisperse Maghemite Nanocrystallites without a Size-Selection Process", J. Am. Chem. Soc., 2001, 123, pp. 12798-12801.

Alexander E. Gash, et al., "Use of Epoxides in the Sol-Gel Synthesis of Porous Iron (III) Oxide Monoliths from Fe(III) Salts", Chem. Mater., 2001, 12, pp. 999 and 1004.

* cited by examiner

SHAPE ANISOTROPIC METAL OXIDE NANOPARTICLES AND SYNTHETIC METHOD THEREOF

BACKGROUND OF THE INVENTION

1. Field of the Invention

The present invention relates to metal oxide nanoparticles and a synthetic method thereof, and in particular to maghemite ($\gamma$-$Fe_2O_3$) particles usable as a superhigh density magnetic recording substance by having good shape anisotropy and magnetic characteristics, hematite ($\alpha$-$Fe_2O_3$) nanoparticles usable as a precursor to the maghemite or as catalysts, maghemite and hematite-mixed particles and a synthetic method thereof.

2. Description of the Related Art

With the development of the telematique industry, increase of memory, miniaturization and high integration of electronic materials have been constantly required in the world semiconductor market.

According to the requirement, recording density of a commercial magnetic recording medium has been increased steadily every year. In the meantime, storing density of a magnetic recording medium is in inverse proportion to a size of a storing bit. In order to control SNR (signal to noise ratio) and other recording variables, the number of ferromagnetic particles per bit has to be great as many as possible. Accordingly, development of a finer-sized new magnetic substance having appropriate coercive force and a high magnitization value has been required. In addition, in order to maximize SNR, exchange coupling between particles has to be prevented by separating each particle, and the particle size distribution has to be in a narrow range.

However, it was discovered the recent method using nano-sized particles had a limit. In more detail, when a particle size is not greater than a specific size (~10 nm), inherent characteristics of a substance are instantly changed into superparamagnetic, it is inappropriate for a magnetic recording medium. In particular, that phenomenon was observed in Co, Ni, Fe or spherical magnetite, maghemite and other ferrite particles, etc. having a size of 10 nm approximately [J. Am. Chem. Soc., 123, 12798(2001); J. Am. Chem. Soc., 122, 8581(2000)].

In addition, in the reported method, a synthetic method of Fe or Fe oxide or ferrite nanoparticles, etc. mostly has to be performed in a nitrogen or an argon atmosphere, and accordingly it is intricate.

In the U.S. Pat. No. 6,302,940, in order to maintain sufficient coercive force while reducing a particle size of a substance, a method for improving crystal magnetic anisotropy has been presented. In the U.S. patent, a nano-sized spherical FePt has been presented, however, in order to change the inherent paramagnetism of the spherical FePt into ferromagnetism, performing an additional heat-treatment process at a temperature not less than 550° C. is required, and oxidation easily occurs in the atmosphere. In addition, because high-priced platinum has to be used, it is not economical, and it is intricate to control a synthetic process in an inert atmosphere.

In recent researches, nano-sized cobalt particles having a rod shape have shown ferromagnetism due to shape magnetic anisotropy and are arranged in the parellel direction, and accordingly it has been researched as a future superhigh density magnetic recording substance. However, in that method, synthesized nano-particles are not stable to oxidation in the atmosphere, a high-priced organometallic compound has to be used as a precursor, a synthetic process has to be performed in an inert atmosphere, and accordingly it is difficult to control the process. In addition, nonoparticles having a spherical shape shows superparamagnetism [Science, 291, 2115(2001)].

In the meantime, maghemite ($\gamma$-$Fe_2O_3$) has been known as a substance having great magnetic anisotropy, and presently rod-shaped maghemite particles having a diameter of 0.25 $\mu$m and a length in the ratio as 6 to the diameter are used as a high density magnetic recording substance. In the synthetic process of the rod-shaped maghemite ($\gamma$-$Fe_2O_3$), first, the rod-shaped hematite ($\alpha$-$Fe_2O_3$) is synthesized, and it is reduced to magnetite ($Fe_3O_4$) with the same size and shape. Next, by oxidizing magnetite carefully, the magnetite is transformed to maghemite. The maghemite is a stable oxide in the atmosphere. However, even in case of maghemite, superparamagnetism occurs in spherical nanoparticles having a size of 10 nm or less. Until now, maghemite having shape anisotropy in a size as approximately 10 nm has not been reported. In case of hematite, nanoparticles (without aggregation) not greater than 30 nm have not been reported regardless of shapes thereof. Hematite nano-particles are expected to have usability as catalysts or pigments besides a precursor to maghemite.

SUMMARY OF THE INVENTION

In order to solve the above-mentioned problems, it is an object of the present invention to provide a method for synthesizing metal oxide nanoparticles with a narrow size distribution and controlling shape anisotropy freely from a spherical to a rod shape.

It is another object of the present invention to provide maghemite ($\gamma$-$Fe_2O_3$) nanoparticles usable as a superhigh density magnetic recording substance by having good shape anisotropy and magnetic characteristics, hematite ($\alpha$-$Fe_2O_3$) nanoparticles usable as a precursor to the maghemite or as catalysts, maghemite and hematite-mixed nanoparticles and a synthetic method thereof.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7b shows an X-ray diffraction pattern of the maghemite nanoparticles in FIG. 7a;

FIG. 8b shows an X-ray diffraction pattern of the hematite nanoparticles in FIG. 8a.

DETAILED DESCRIPTION OF THE PREFERRED EMBODIMENT

In order to achieve the above-mentioned objects, a method for synthesizing metal oxide nanoparticles includes forming a reverse micelle solution by adding distilled water, a surfactant and a solvent to metallic salt not less than trivalent, precipitating gel type amorphous metal oxide particles by adding proton scavenger to the reverse micelle solution and separating them; adjusting the molar ratio of metal oxide to surfactant by washing the gel type amorphous metal oxide particles with a polar solvent; and crystallizing metal oxide nanoparticles by heating or reflux after dispersing the gel type amorphous metal oxide particles in a non-polar solvent having a high boiling point.

In the present invention, by adjusting a molar ratio of distilled water to the metallic salt, it is possible to adjust a particle size of finally obtained metal oxide. By fixing all other variables and varying a quantity of distilled water, it is possible to vary a molar ratio of distilled water to surfactant included in a reverse micelle solution. Accordingly, according to quantity increase of distilled water, a size of reverse micelle is increased, and accordingly a size of gel type amorphous metal oxide formed in each reverse micelle and a size of nanoparticle finally crystallized from the metal oxide can be increased. Accordingly, it is possible to synthesize nanoparticles having a greater diameter by adjusting a quantity of distilled water and surfactant within the range of CMC (Critical Micelle Concentration).

In the present invention, the surfactant is one selected from RCOOH, $RNH_2$ or mixtures thereof, and it is preferable to have R— as alkyl or alkenyl having six or more of hydrocarbon chains. Herein, in order to have sufficient hydrophobic properties, there have to be at least six carbon chains. And, by selecting COOH or $NH_2$ as a hydrophilic functional group at the end of the carbon chains, the reverse micelle can easily include a water pool therein, and later on, shape of the nanoparticles can be controlled by a coated level with the surfactant.

In the present invention, a solvent for forming the reversed micelle solution is one selected from dibenzylether or diphenylether.

Because the solvent has density higher than water and non-polarity, each reverse micelle including a water pool therein can be homogeneously dispersed and supported in the solvent, and accordingly gel type amorphous metal oxide with a narrow size distribution can be formed. On the contrary, when a non-polar solvent having lower density such as toluene is used, a homogeneous reverse micelle can not be formed, and the aqueous (bottom) layer is separated from the organic solvent (top) layer.

In the present invention, the proton scavenger is one selected from etylene oxide, propylene oxide, 1,2-epoxybutane, 1,2-epoxypentane, 2,3-epoxypropylbenzene, trimethylene oxide, glycidol, epichlorohydrin, or epibromohydrin. The epoxy compounds or epoxy derivatives form monolithic gel of amorphous metal oxide by proceeding gelation reaction slowly by capturing proton from hydrate of not less trivalent metal salt. In the present invention, by proceeding the gelation reaction in each reverse micelle, not monolithic gel but size-controlled amorphous particles are synthesized first, in a next process, they are crystallized, simultaneously a size thereof is uniformly reduced, and a shape thereof is controlled.

In the present invention, a polar solvent for washing the gel type amorphous metal oxide particles is one selected from methanol, ethanol, propanol or acetone, etc. By performing the washing, negative ions can be eliminated, and part of excessively existing surfactant can be eliminated. Negative ions generated from ferric salt as a by-product can not be efficiently eliminated with a non-polar solvent. On the contrary, a solvent having strong polarity such as water eliminates all surfactant coating the surface of metal oxide, and accordingly aggregation and growth of particles occur.

In the present invention, by adjusting the number of washing times in which the gel type amorphous metal oxide particles are washed with the polar solvent, it is possible to adjust shape anisotropy of the crystallized metal oxide nanoparticles. When part of surfactant is eliminated by the polar solvent, surface density of the surfactant coating the surface of the amorphous metal oxide is reduced. According to that, when crystallization is induced by heating or reflux a specific crystalline face is exposed, and a metal oxide crystal is formed as a rod shape along the exposed specific crystalline direction. Accordingly, when the number of washing times is increased, shape anisotropy of crystallized metal oxide particles is increased, however, when it exceeds a certain limit, aggregation and growth of particles occur. In Examples of the present invention, it is preferable to have the number of washing times within the range of 2~6. Because washing exceeding six times may induce aggregation of particles, it is not preferable. On the other hand, in case of washing less than twice, a small amount of negative ions may exist as impurities.

In the present invention, it is preferable to use tetralin as a non-polar solvent for heating or refluxing the gel type amorphous metal oxide particles. Because tetralin is a non-polar solvent, a quantity of the surfactant coating the oxide's surface can be maintained as it is; because tetralin has a high boiling point (207° C.), it is possible to supply sufficient heat for the amorphous metal oxide to crystallize; because tetralin has a reducing property, it is possible to crystallize amorphous iron oxide as a maghemite phase, a hematite phase and a maghemite and hematite-mixed phase according to moisture and temperature conditions.

In the present invention, as a condition to synthesize nano-crystalline particles by heating or refluxing the gel type amorphous metal oxide particles with the tetralin solvent, only maghemite phase is obtained by eliminating moisture by vacuum-drying and performing reflux at a temperature within the range of 215~219° C. in a nitrogen atmosphere. In addition, only hematite phase is obtained by heating at a temperature within the range of 165~168° C. in the air without eliminating moisture strictly, and maghemite and hematite-mixed phases can be obtained by performing heating at a temperature within the range of 168~214° C. Although reflux is performed at a temperature within the range of 214~219° C. in a nitrogen atmosphere, when moisture is not completely eliminated by vacuum-drying, maghemite and hematite-mixed nanoparticles are obtained. Accordingly, a phase has to be controlled by adjusting both moisture and temperature.

In the present invention, as a reflux time increases, magnetism of the nano-sized metal oxide particles increases. The longer the reflux time, the higher the crystallinity of particles, it is difficult to discriminate in an XRD pattern, however it can be discriminated with a magnetization value which is more sensitive experimental value, and accordingly increase of magnetism can be analyzed. When reflux is performed for a time 10 hours longer than a standard experiment condition (10 hours), the increased magnetization value is 10.3 emu/g under a magnetic field of 1 T.

In the present invention, the metallic salt not less than trivalent can include metallic ions selected from $Fe^{3+}$, $Ru^{3+}$, $OS^{3+}$, $Cr^{3+}$, $Al^{3+}$, $In^{3+}$, $Ga^{3+}$, $Sn^{4+}$, $Zr^{4+}$, $Hf^{4+}$, $Nb^{5+}$, $W^{6+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, or $Lu^{3+}$. In hydrate of metallic ions not less than trivalent, because positive charge density around metal is high, coordinated water ligand gives proton easily to scavenger and condensation reaction between the same kinds and polymerization proceed, and accordingly gel type amorphous metal oxide can be formed.

Next, the trivalent metal salt is one selected from $FeCl_3$ or hydrate thereof ($FeCl_3.xH_2O$), $Fe(NO_3)_3$ or hydrate thereof [$Fe(NO_3)_3.xH_2O$], $Fe_2(SO_4)_3$ or hydrate thereof [$Fe_2(SO_4)_3.xH_2O$], $FePO_4$ or hydrate thereof [$FePO_4.xH_2O$], $Fe(OOCCH_3)_3$ or hydrate thereof [$Fe(OOCCH_3)_3.xH_2O$]. In that case, the nano-sized metal oxide particles can be maghemite ($\gamma$-$Fe_2O_3$) or hematite ($\alpha$-$Fe_2O_3$) or maghemite and hematite-mixed particles.

In the meantime, by the method for synthesizing the metal oxide particles in accordance with the present invention, rod-shaped maghemite ($\gamma$-$Fe_2O_3$) or hematite ($\alpha$-$Fe_2O_3$) or maghemite and hematite-mixed particles having a particle diameter of 2–10 nm and a ratio of length to diameter not less than 1 and not greater than 10 can be obtained. In the conventional art, in order to get a strong coercive force by shape anisotropy, maghemite particles having a diameter of 0.25 µm and a ratio of length to diameter as approximately 6 have been used for fabrication of magnetic recording media. In general, up to a ratio of length to diameter as 6, a coercive force is greatly increased, when a ratio of length to diameter exceeds 6, a coercive force is increased insignificantly. In the present invention, it is possible to synthesize nanoparticles having a ratio of length to diameter as approximately 10 by heating or refluxing amorphous metal oxide.

EXAMPLE 1

1.297 g (4.80 mmol) of $FeCl_3.6H_2O$ as purchased was dissolved in 0.432 ml (24.0 mmol) of deionized-distilled water, 9.17 ml (28.8 mmol) of oleic acid was added thereto, and it was stirred. Next, by adding of 150 ml of dibenzylether thereto, a reverse micelle solution having an aqueous solution therein was obtained. Adding 3.067 g (52.8 mmol) of propylene oxide to the reverse micelle solution and stirring for 30 minutes produced a brown precipitate. By separating the brown precipitate by centrifugation, washing it with 45 ml of ethanol three times and drying it in the atmosphere, 570 mg of gel type amorphous iron(III) oxide was obtained.

Figure 1:
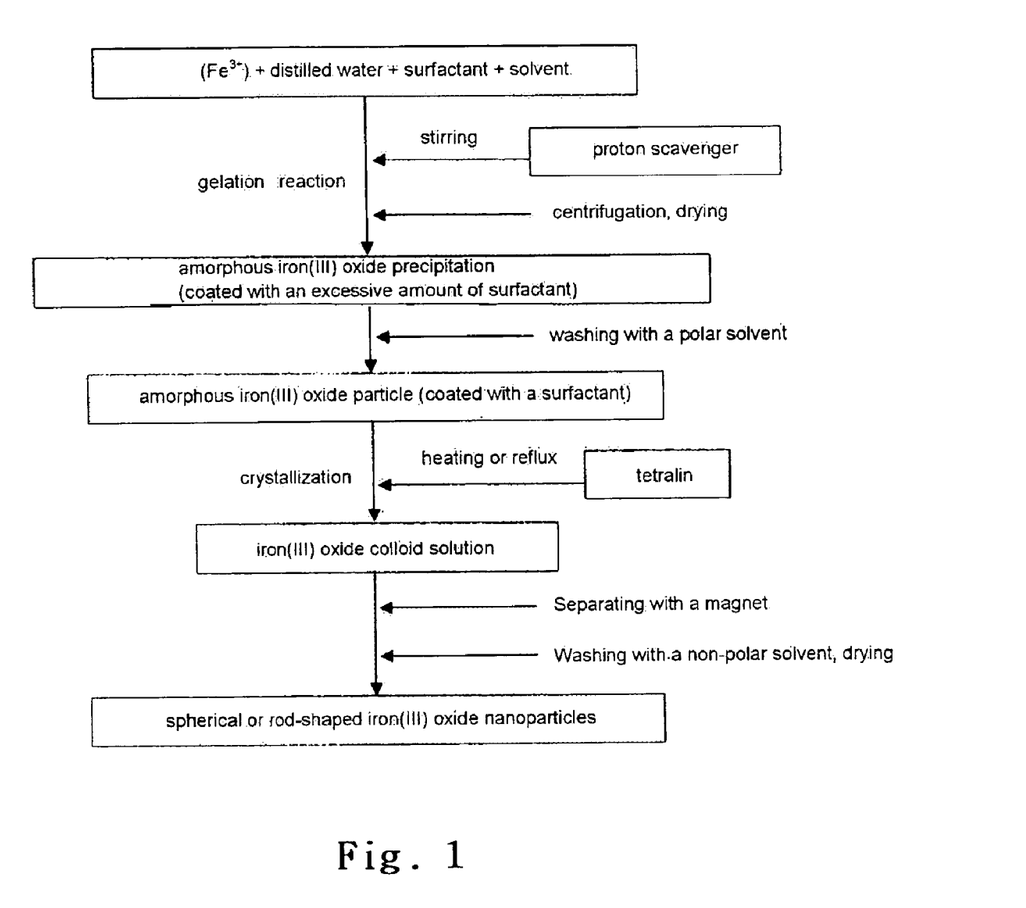
FIG. 1 is a flow chart illustrating a method for synthesizing metal oxide nanoparticles in accordance with the present invention.
Figure 2:
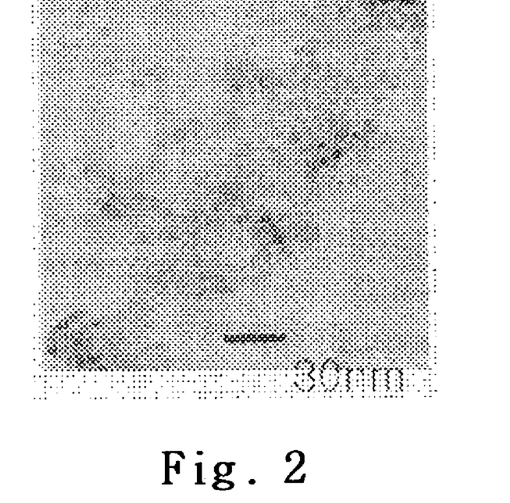
FIG. 2 is a transmission electron microscopic image showing spherical maghemite nanoparticles synthesized in accordance with Example 1 of the present invention.

Drying the gel type particle for 5 hours in a vacuum, dispersing it in 57 ml of tetralin solvent and then refluxing it for 10 hours (at 215~219° C.) under a nitrogen, yielded a dispersion of spherical maghemite nanocrystallites. The bigger particles attracted to a magnet were separated from the dispersion and the smaller particles not sticking to a magnetic were precipitated by adding an excessive amount of acetone to the residual solution. From this moment, the smaller nanoparticles were attracted to a magnetic, too. By washing the particles with hexanes twice and drying in the air, 150 mg of bigger particles (having a diameter as 6 nm) and 47 mg of smaller particles (having a diameter as 2 nm) were obtained. FIG. 2 is a transmission electron microscopic image showing the bigger particles.

EXAMPLE 2

1.297 g (4.80 mmol) of $FeCl_3.6H_2O$ as purchased was dissolved in 0.432 ml (24.0 mmol) of deionized-distilled water, 9.17 ml (28.8 mmol) of oleic acid was added thereto, and it was stirred. Next, by adding of 150 ml of dibenzylether thereto, a reverse micelle solution having an aqueous solution therein was obtained. Adding 3.067 g (52.8 mmol) of propylene oxide to the reverse micelle solution and stirring for 30 minutes, produced a brown precipitate. By separating the brown precipitate by centrifugation, washing it with 45 ml of ethanol four times and drying it in the atmosphere, 476 mg of gel type amorphous iron(III) oxide was obtained.

Figure 3:
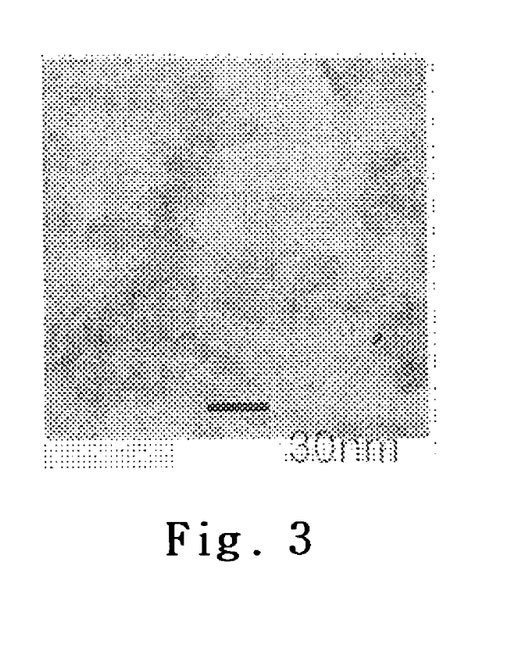
FIG. 3 is a transmission electron microscopic image showing rod-shaped maghemite nanoparticles synthesized in accordance with Example 2 of the present invention.

Drying the gel type particle for 5 hours in a vacuum, dispersing it in a tetralin solvent and refluxing it for 10 hours (at 215~219° C.) under a nitrogen, yielded a dispersion of rod-shaped maghemite nanocrystallites. In that case, because an amorphous particle washed four times, lost more surfactants than a particle washed three times, the amorphous particle exposed a specific crystalline face during crystallization, and accordingly it grew as a rod-shaped particle. By separating particles pulled by a magnet, washing them with hexanes twice and drying them, 159 mg of rod-shaped maghemite nanoparticles having a size of 6×21 (diameter×length) nm were obtained. FIG. 3 is a transmission electron microscopic image showing the nanoparticles.

EXAMPLE 3

Figure 4A:
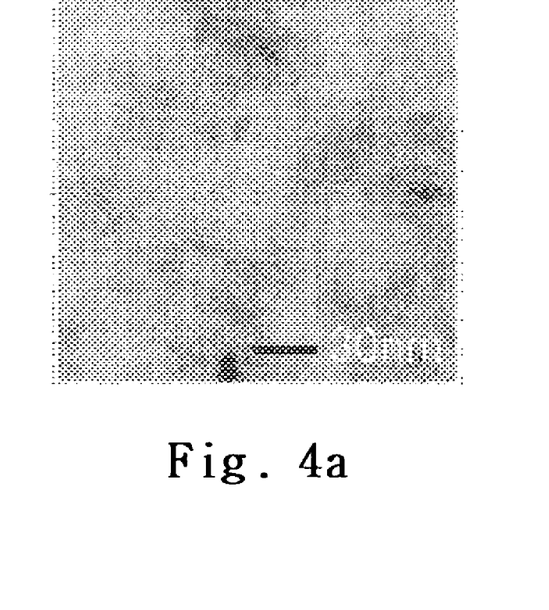
FIG. 4a is a transmission electron microscopic image showing maghemite nanoparticles synthesized by passing a reflux process for 10 hours in accordance with Example 3 of the present invention.
Figure 4B:
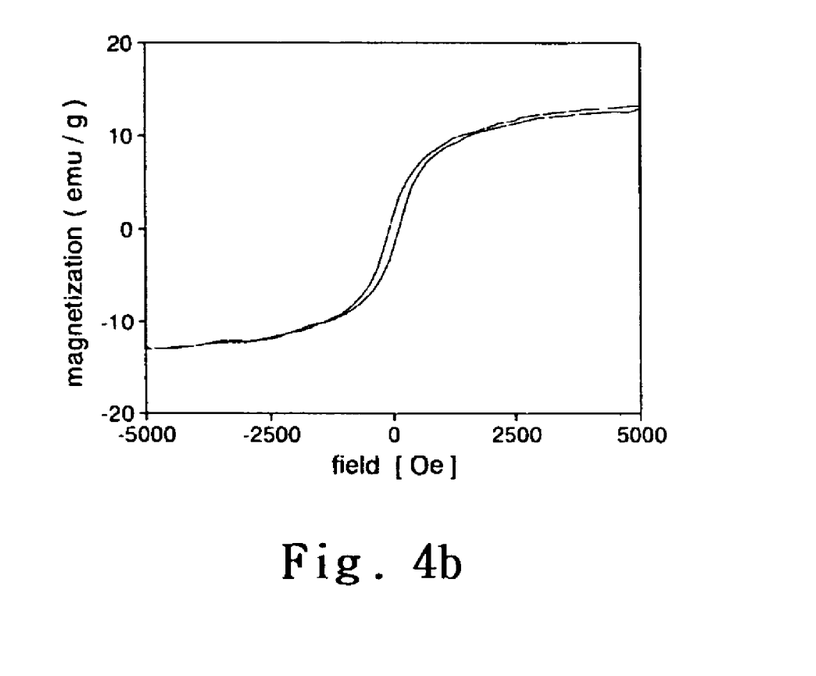
FIG. 4b shows a magnetic hysteresis loop of maghemite nanoparticles in FIG. 4a measured by a vibrating sample magnetometry.
Figure 5A:
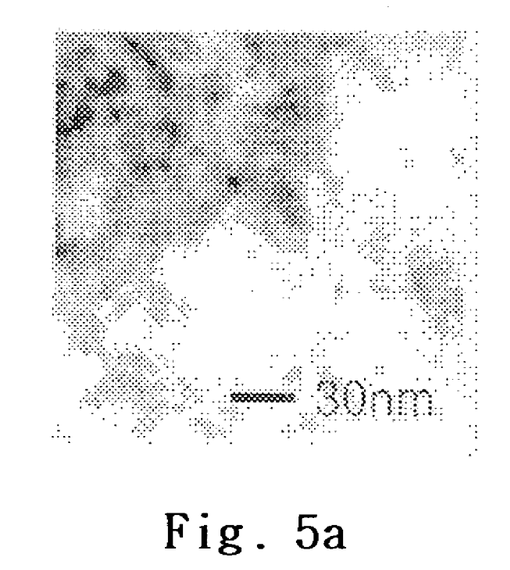
FIG. 5a is a transmission electron microscopic image showing maghemite nanoparticles synthesized by passing a reflux process for 15 hours in accordance with Example 3 of the present invention.
Figure 5B:
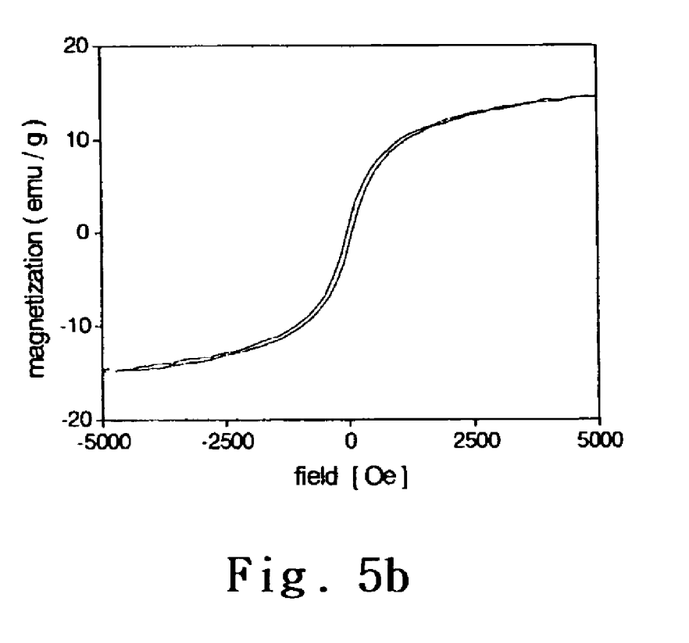
FIG. 5b shows a magnetic hysteresis loop of maghemite nanoparticles in FIG. 5a measured by a vibrating sample magnetometry.
Figure 6A:
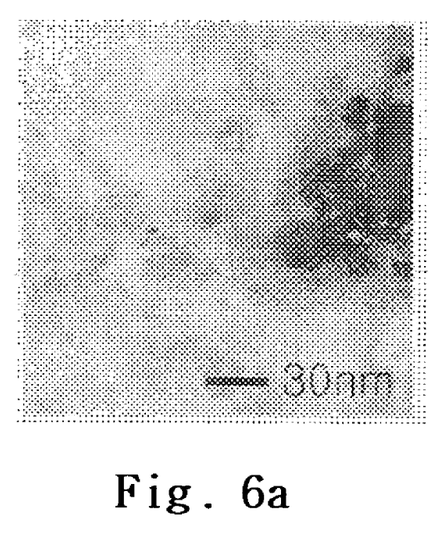
FIG. 6a is a transmission electron microscopic image showing maghemite nanoparticles synthesized by passing a reflux process for 20 hours in accordance with Example 3 of the present invention.
Figure 6B:
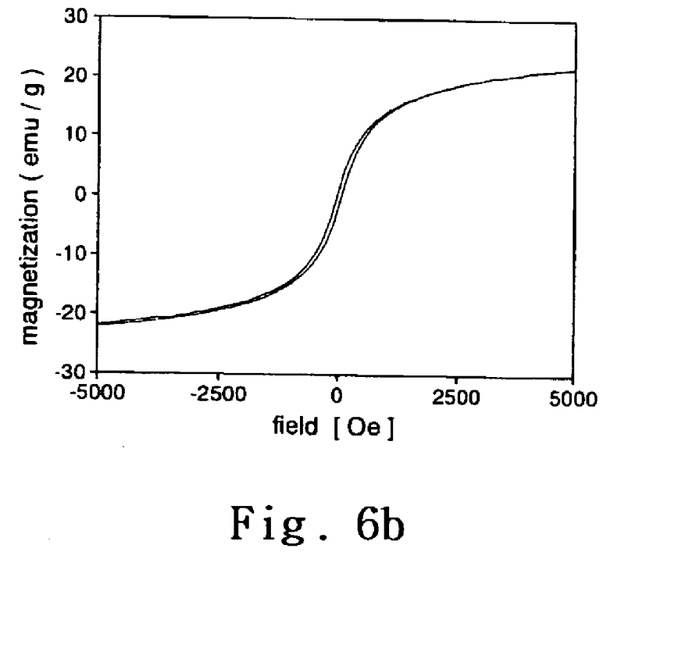
FIG. 6b shows a magnetic hysteresis loop of maghemite nanoparticles in FIG. 6a measured by a vibrating sample magnetometry.

An experiment was performed same with Example 2 except changing an amount of deionized-distilled water as 0.950 ml (52.8 mmol), the experiment was performed by taking ⅓ of a total solution during reflux at 10, 15, and 20 hour. 172 mg of rod-shaped maghemite nanoparticles having a size as 7×24 nm were obtained. FIGS. 4a, 5a, and 6a respectively show transmission electron microscopic images, and FIGS. 4b, 5b and 6b respectively show magnetic hysteresis loops measured by a vibrating sample magnetometry. As shown in FIGS. 4a, 5a, and 6a, there was no change in a particle size but, magnetism was increased, bundles of rod-shaped particles arranged in the same direction by a magnetic dipole were increased as reflux time increased. In addition, as shown in FIGS. 4b, 5b and 6b, according to the reflux time increase as 10 hours, in a 1 T of magnetic filed, magnetic susceptibility is increased slightly (10.3 emu/g), and coercive force is slightly reduced.

EXAMPLE 4

Figure 7A:
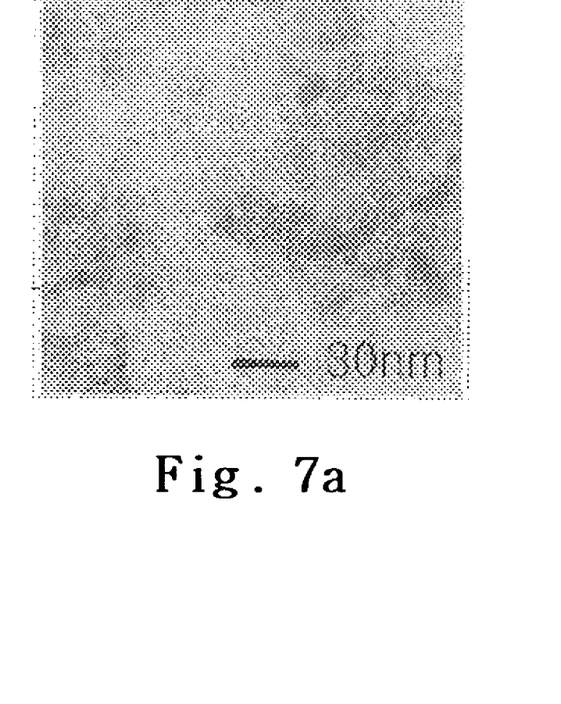
FIG. 7a is a transmission electron microscopic image showing rod-shaped maghemite nanoparticles synthesized in accordance with Example 4 of the present invention.
Figure 7B:
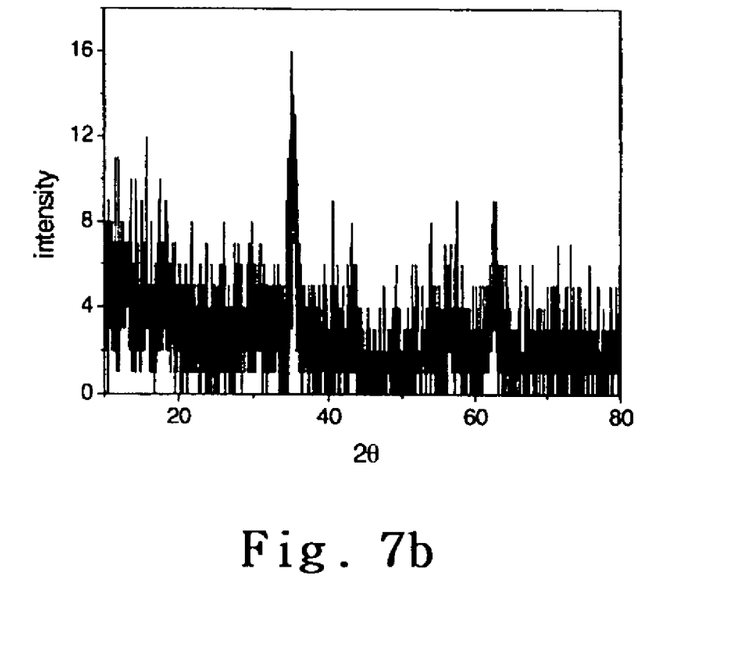

An experiment was performed same with Example 2 except changing an amount of deionized-distilled water as 1.642 ml (91.2 mmol) and changing a reflux time as 10 hours. 169 mg of rod-shaped maghemite nanoparticles having an average diameter×length as 8×26 nm were separated. FIG. 7a is a transmission electron microscopic image showing rod-shaped maghemite particles synthesized in accordance with Example 4 of the present invention, and FIG. 7b shows an X-ray diffraction pattern of the maghemite nanoparticles in FIG. 7a.

In the meantime, in X-ray diffraction patterns of Examples 1~4, difference according to size, shape or reflux time, etc. of particles was insignificant.

EXAMPLE 5

Figure 8A:
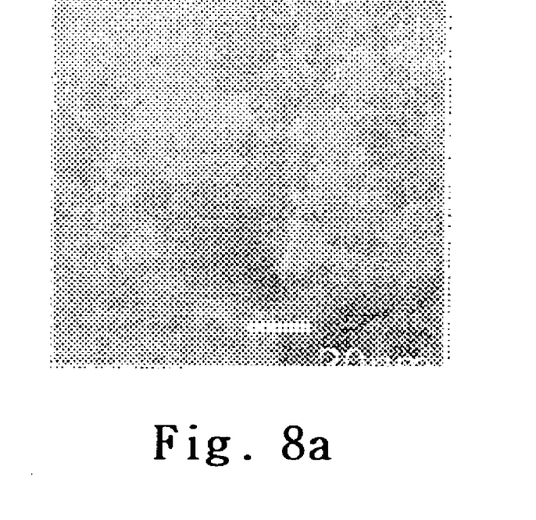
FIG. 8a is a transmission electron microscopic image showing rod-shaped hematite nanoparticles synthesized in accordance with Example 5 of the present invention.
Figure 8B:
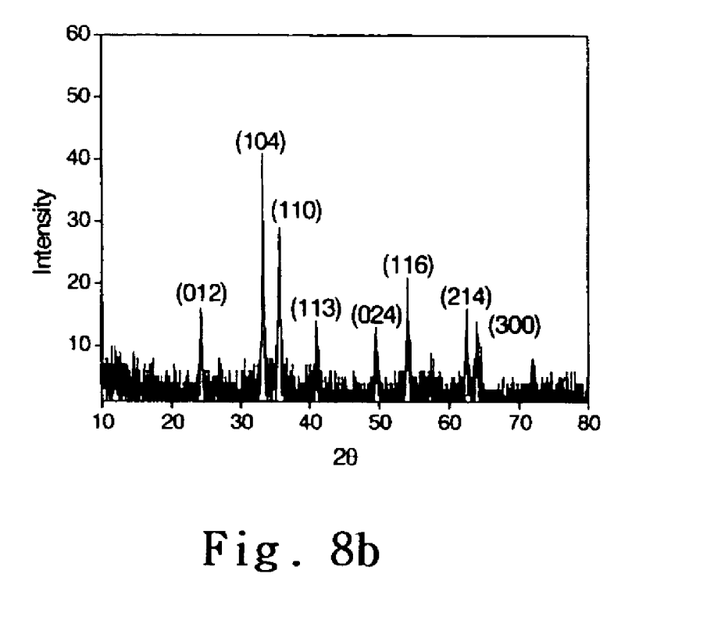

An experiment was performed same with Example 3 except dispersing amorphous metal oxide without vacuum-drying in a tetralin solvent and heating it under nitrogen for 10 hours at 165~168° C. 188 mg of rod-shaped hematite nanoparticles having a size as 6×20 nm were separated. FIG. 8a is a transmission electron microscopic image showing rod-shaped hematite nanoparticles synthesized in accordance with Example 5 of the present invention, and FIG. 8b shows an X-ray diffraction pattern of the hematite nanoparticles in FIG. 8a.

EXAMPLE 6

Figure 9:
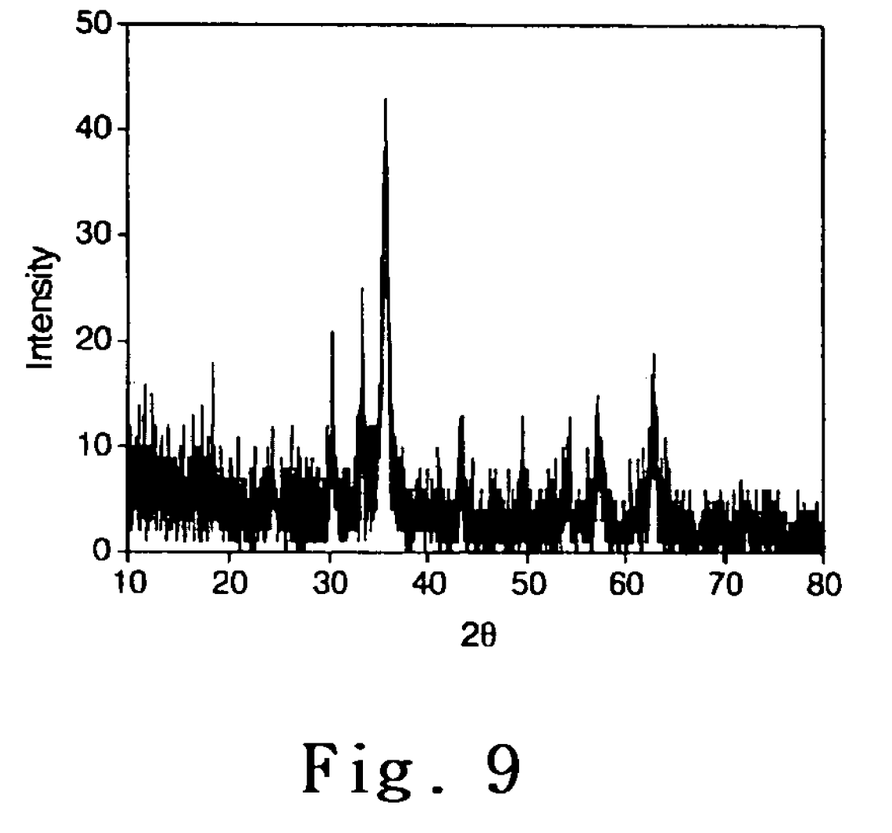
FIG. 9 shows an X-ray diffraction pattern of rod-shaped maghemite and hematite mixed nanoparticles synthesized in accordance with Example 6 of the present invention.

An experiment was performed same with Example 3 except dispersing amorphous metal oxide without vacuum-drying in a tetralin solvent and heating it under nitrogen for 10 hours at 181~186° C. 170 mg of rod-shaped maghemite and hematite-mixed nanoparticles having a size as 7×24 nm were separated. FIG. 9 shows an X-ray diffraction pattern thereof.

As described above, in a method for synthesizing metal oxide particles in accordance with the present invention, size, uniformity, shape and phase of particles can be easily controlled.

In addition, the method for synthesizing metal oxide particles in accordance with the present invention has a multi-choice in chooing a metallic source material, and accordingly metal oxide nanoparticles can be synthesized economically by using a low-priced substance such as trivalent ferric salt.

In addition, the present invention can provide maghemite, hematite, maghemite and hematite-mixed nanoparticles (having a diameter not greater than 20 nm) having high shape anisotropy and phase-controlled characteristics, they have superior shape anisotropy, atmospheric stability and magnetic characteristics, and accordingly they are very usable substances for magnetic recording media.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for synthesizing metal oxide nanoparticles, comprising:
   forming a reverse micelle solution by adding distilled water, a surfactant and a solvent to metallic salt of not less than trivalent, precipitating and separating gel type amorphous metal oxide particles by adding proton scavenger to the reverse micelle solution;
   adjusting a molar ratio of metal oxide to the surfactant by washing the gel type amorphous metal oxide particles with a polar solvent; and
   crystallizing metal oxide nanoparticles by heating or reflux after dispersing the gel type amorphous metal oxide particles in a non-polar solvent having a boiling point greater than 165° C.

2. The method of claim 1, wherein a size of a finally obtained metal oxide particle is increased according to increase of a molar ratio of distilled water to metallic salt.

3. The method of claim 1, wherein the surfactant is one selected from RCOOH, $RNH_2$ or mixtures thereof, and R— is alkyl or alkenyl consisting of hydrocarbon chains not less than six.

4. The method of claim 1, wherein the solvent for forming the reverse micelle solution is one selection from dibenzylether or diphenylether.

5. The method of claim 1, wherein the proton scavenger is one selection from ethylene oxide, propylene oxide, 1,2-epoxybutane, 1,2-epoxypentane, 2,3-epoxypropylbenzene, trimethylene oxide, glycidol, epichlorohydrin, or epibromohydrin.

6. The method of claim 1, wherein the polar solvent for washing the gel type amorphous metal oxide particles is one selected from methanol, ethanol, propanol or acetone.

7. The method of claim 1, wherein shape anisotropy of crystallized metal oxide particles can be increased by increasing the number of the gel type amorphous metal oxide particles-washing times.

8. The method of claim 1, wherein a non-polar solvent for heating or refluxing the gel type amorphous metal oxide particles is tetralin.

9. The method of claim 1, wherein magnetism of the metal oxide nanoparticle is increased according to increase of heating or reflux time.

10. The method of claim 1, wherein the metallic salt of not less than trivalent includes metallic ions selected from $Fe^{3+}$, $RU^{3+}$, $Os^{3+}$, $Cr^{3+}$, $Al^{3+}$, $In^{3+}$, $Ga^{3+}$, $Sn^{4+}$, $Zr^{4+}$, $Hf^{4+}$, $Nb^{5+}$, $W^{6+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, or $Lu^{3+}$.

11. The method of claim 1, wherein the metal salt of not less than trivalent is a trivalent ferric salt is one selected from the group consisting of $FeCl_3$ or hydrate thereof ($FeCl_3 xH_2O$), $Fe(NO_3)_3$ or hydrate thereof [$Fe(NO_3)_3 \cdot xH_2O$], $Fe_2(SO_4)_3$ or hydrate thereof [$Fe_2(SO_4)_3 xH_2O$], $FePO_4$ or hydrate thereof [$FePO_4 xH_2O$], $Fe(OOCCH_3)_3$ or hydrate thereof [$Fe(OOCCH_3)_3 \cdot xH_2O$], and the nano-sized metal oxide particles are maghemite ($\gamma$-$Fe_2O_3$) or hematite ($\alpha$-$Fe_2O_3$) or maghemite and hematite-mixed particles.

12. The method of claim 11, wherein only maghemite phase is obtained by eliminating moisture from the gel type amorphous metal oxide particles through vacuum-drying and performing reflux at a temperature in the range of from about 214—to about 224° C. in a nitrogen atmosphere.

13. The method of claim 11, wherein only hematite phase is obtained by drying the gel type amorphous metal oxide particles only in the atmosphere and heating at a temperature in the range from about 150—to about 168° C. in a nitrogen atmosphere.

14. The method of claim 1, wherein maghemite and hematite-mixed phase is obtained by drying the gel type amorphous metal oxide particles only in the atmosphere and performing heating or refluxing at a temperature in the range from about 150—to about 224° C. in a nitrogen atmosphere.

15. The method of claim 1, wherein the metal oxide nanoparticles are rod-shaped maghemita ($\gamma$-$Fe_2O_3$) nanoparticles having an average diameter of 2~10 nm and a ratio of length to diameter thereof that exceeds 1 and is not greater than 10.

16. The method of claim 1, wherein the metal oxide nanoparticles are rod-shaped hematite ($\alpha$-$Fe_2O_3$) nanoparticles having an average diameter thereof of 2~10 nm, and a ratio of length to diameter thereof that exceeds 1 and is not greater than 10.

17. The method of claim 1, wherein the metal oxide nanoparticles are rod-shaped maghemite ($\gamma$-$Fe_2O_3$) and hematite -($\alpha$-$Fe_2O_3$)-mixed nanoparticles having an average diameter of 2~10 nm, and a ratio of length to diameter thereof that exceeds 1 and is not greater than 10.

* * * * *